US011695594B2

(12) United States Patent
Gao et al.

(10) Patent No.: US 11,695,594 B2
(45) Date of Patent: Jul. 4, 2023

(54) SOUNDING REFERENCE SIGNAL TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 239 days.

(21) Appl. No.: 17/055,389

(22) PCT Filed: May 14, 2018

(86) PCT No.: PCT/CN2018/086670
§ 371 (c)(1),
(2) Date: Nov. 13, 2020

(87) PCT Pub. No.: WO2019/218108
PCT Pub. Date: Nov. 21, 2019

(65) Prior Publication Data
US 2021/0194737 A1      Jun. 24, 2021

(51) Int. Cl.
*H04L 27/26* (2006.01)
*H04L 25/02* (2006.01)
(Continued)

(52) U.S. Cl.
CPC ........ *H04L 25/0226* (2013.01); *H04L 5/0051* (2013.01); *H04L 27/2607* (2013.01);
(Continued)

(58) Field of Classification Search
CPC ............. H04L 27/26025; H04L 5/0051; H04L 27/2607; H04W 72/042; H04W 72/0446; H04W 72/0493
See application file for complete search history.

(56) References Cited

U.S. PATENT DOCUMENTS

2011/0268087 A1* 11/2011 Kwon ................... H04L 5/0005
370/328
2017/0366311 A1* 12/2017 Iyer ........................ H04L 5/0007
2018/0123850 A1    5/2018 Zarifi et al.

FOREIGN PATENT DOCUMENTS

BR       112013008522 A2 *  7/2016  .......... H04L 5/0007
CA            3042760 A1 *  5/2018  .......... H04B 7/2643
(Continued)

OTHER PUBLICATIONS

Samsung, "Guard period in UL backhaul subframes", 3GPP TSG RAN WG1 #57, R1-091870, San Francisco, USA, May 4-8, 2009 (3 pages total).
(Continued)

*Primary Examiner* — Samina F Choudhry
(74) *Attorney, Agent, or Firm* — Sughrue Mion, PLLC

(57) ABSTRACT

Embodiments of the present disclosure relate to methods, devices and computer readable mediums for sounding reference signal (SRS) transmission. In example embodiments, a method implemented at a terminal device is provided. According to the method, in response to at least one set of SRS resources being configured for transmitting a SRS to a network device and antenna switching being enabled for the terminal device, the terminal device determines at least one guard period required for transmitting the SRS. Uplink transmission to the network device is expected to be scheduled outside the at least one guard period. In response to the uplink transmission being scheduled outside the at least one guard period, the terminal device transmits the SRS to the network device over the at least one set of SRS resources. In response to the uplink transmission being scheduled within the at least one guard period, the terminal device disables at least a part of the at least one set of SRS resources for transmitting the SRS.

14 Claims, 10 Drawing Sheets

(51) Int. Cl.
  *H04L 5/00* (2006.01)
  *H04W 72/0446* (2023.01)
  *H04W 72/23* (2023.01)
  *H04W 72/53* (2023.01)

(52) U.S. Cl.
  CPC ... *H04L 27/26025* (2021.01); *H04W 72/0446* (2013.01); *H04W 72/23* (2023.01); *H04W 72/53* (2023.01)

(56) References Cited

FOREIGN PATENT DOCUMENTS

| | | | | |
|---|---|---|---|---|
| CN | 104685822 A | | 6/2015 | |
| CN | 105580290 A | * | 5/2016 | ......... H04B 7/18506 |
| CN | 106850164 A | | 6/2017 | |
| JP | 2020518188 A | * | 6/2020 | |
| KR | 20100026390 A | * | 3/2010 | |
| WO | 2017/113514 A1 | | 7/2017 | |
| WO | 2018/006752 A1 | | 1/2018 | |
| WO | 2018/023510 A1 | | 2/2018 | |
| WO | 2018/082060 A1 | | 5/2018 | |

OTHER PUBLICATIONS

Samsung, "Discussion on SRS capacity enhancement with increasing UpPTS symbols", 3GPP TSG RAN WG1 Meeting #83, R1-156785, Anaheim, USA, Nov. 15-22, 2015 (5 pages total).

Office Action dated Jun. 7, 2022 in Japanese Application No. 2020-563932.

Qualcomm Incorporated, "Maintenance for SRS", 3GPP TSG RAN WG1 Meeting #93, R1-1807349, Busan, Korea, May 21-25, 2018 (6 pages total).

LG Electronics, "Remaining issues on SRS", 3GPP TSG RAN WG1 Meeting #92bis, R1-1804548, Sanya, China, Apr. 16-20, 2018 (12 pages total).

International Search Report for PCT/CN2018/086670 dated Feb. 2, 2019 [PCT/ISA/210].

Written Opinion for PCT/CN2018/086670 dated Feb. 2, 2019 [PCT/ISA/237].

* cited by examiner

SOUNDING REFERENCE SIGNAL TRANSMISSION

CROSS REFERENCE TO RELATED APPLICATIONS

This application is a National Stage of International Application No. PCT/CN2018/086670 filed May 14, 2018.

TECHNICAL FIELD

Embodiments of the present disclosure generally relate to the field of telecommunication, and in particular, to methods, devices and computer readable mediums for sounding reference signal (SRS) transmission.

BACKGROUND

Generally speaking, SRS, which is transmitted from a terminal device to a network device, can be used by the network device to estimate an uplink channel (for example, (Physical Uplink Shared Channel (PUSCH)) between the terminal device and the network device. The network device can perform resource allocation and configure transmission parameters for uplink transmission over the uplink channel based on the result of the estimation. Prior to transmission of SRS, the network device may allocate one or more SRS resource sets to the terminal device for the SRS transmission. Each of the one or more SRS resource sets may include one or more SRS resources.

The terminal device may be equipped with multiple antennas for transmitting/receiving signals (for example, the SRS or any other signals) to/from the network device. With multiple antennas supported by the terminal device, SRS antenna switching can be supported. SRS antenna switching generally provides two distinct purposes: uplink transmission diversity for PUSCH, which may be either open loop or closed loop, and time division duplex (TDD) or frequency division duplex (FDD) downlink MIMO beamforming based on channel reciprocity. In the 3rd Generation Partnership Project (3GPP) specification for the fifth generation (5G) New Radio (NR), it has been agreed that 1T4R (that is, 1 transmit antenna and 4 receive antennas) antenna switching for SRS transmission can be supported by two aperiodic SRS resource sets. The two aperiodic SRS resource sets with total four SRS resources can be transmitted in different symbols of two different slots. Each SRS resource consists of a single SRS port, where the SRS port of each SRS resource is associated with a different antenna port of the terminal device. Each of the two SRS resource sets consists of two SRS resources, or one SRS resource set consists of a single SRS resource and the other SRS resource set consists of three SRS resources.

In case that the antenna switching for SRS transmission is enabled, a guard period may be required for SRS transmission, where the terminal device does not transmit any other signals, since the terminal device needs some time for switching antenna ports to transmit different signals. However, how to indicate the guard period required for SRS transmission have not been specified.

SUMMARY

In general, example embodiments of the present disclosure provide methods, devices and computer readable mediums for SRS transmission.

In a first aspect, there is provided a method implemented at a terminal device. According to the method, in response to at least one set of SRS resources being configured for transmitting a SRS to a network device and antenna switching being enabled for the terminal device, the terminal device determines at least one guard period required for transmitting the SRS. Uplink transmission to the network device is expected to be scheduled outside the at least one guard period. In response to the uplink transmission being scheduled outside the at least one guard period, the terminal device transmits the SRS to the network device over the at least one set of SRS resources. In response to the uplink transmission being scheduled within the at least one guard period, the terminal device disables at least a part of the at least one set of SRS resources for transmitting the SRS.

In a second aspect, there is provided a method implemented at a network device. According to the method, in response to at least one set of sounding reference signal (SRS) resources being configured for receiving a SRS from a terminal device and antenna switching being enabled for the terminal device, the network device determines at least one guard period required for receiving the SRS, wherein uplink reception from the terminal device is expected to be scheduled outside the at least one guard period. In response to the uplink reception being scheduled outside the at least one guard period, the network device receives the SRS from the terminal device over the at least one set of SRS resources. In response to the uplink reception being scheduled within the at least one guard period, the network device disables at least a part of the at least one set of SRS resources for receiving the SRS.

In a third aspect, there is provided a device. The device comprises a processor and a memory coupled to the processor. The memory stores instructions that when executed by the processor, cause the device to perform actions. The actions include: in response to at least one set of sounding reference signal (SRS) resources being configured for transmitting a SRS to a network device and antenna switching being enabled for the device, determining at least one guard period required for transmitting the SRS, wherein uplink transmission to the network device is expected to be scheduled outside the at least one guard period; in response to the uplink transmission being scheduled outside the at least one guard period, transmitting the SRS to the network device over the at least one set of SRS resources; and in response to the uplink transmission being scheduled within the at least one guard period, disabling at least a part of the at least one set of SRS resources for transmitting the SRS.

In a fourth aspect, there is provided a device. The device comprises a processor and a memory coupled to the processor. The memory stores instructions that when executed by the processor, cause the device to perform actions. The actions include: in response to at least one set of sounding reference signal (SRS) resources being configured for receiving a SRS from a terminal device and antenna switching being enabled for the terminal device, determining at least one guard period required for receiving the SRS, wherein uplink reception from the terminal device is expected to be scheduled outside the at least one guard period; in response to the uplink reception being scheduled outside the at least one guard period, receiving the SRS from the terminal device over the at least one set of SRS resources; and in response to the uplink reception being scheduled within the at least one guard period, disabling at least a part of the at least one set of SRS resources for receiving the SRS.

In a fifth aspect, there is provided a computer readable medium having instructions stored thereon. The instructions, when executed on at least one processor, cause the at least one processor to carry out the method according to the first aspect of the present disclosure.

In a sixth aspect, there is provided a computer readable medium having instructions stored thereon. The instructions, when executed on at least one processor, cause the at least one processor to carry out the method according to the second aspect of the present disclosure.

In a seventh aspect, there is provided a computer program product that is tangibly stored on a computer readable storage medium. The computer program product includes instructions which, when executed on at least one processor, cause the at least one processor to carry out the method according to the first aspect or the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
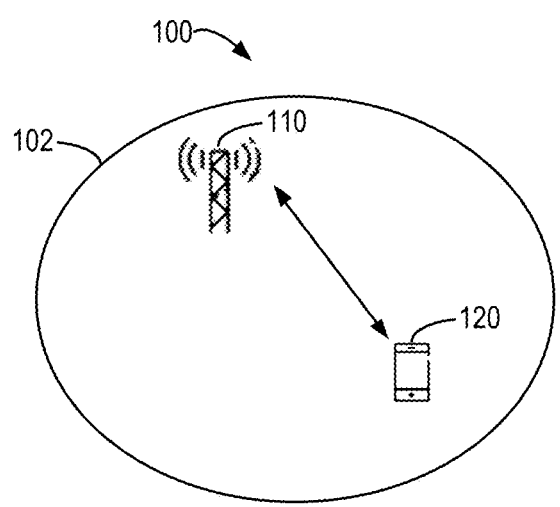
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As described above, SRS, which is transmitted from a terminal device to a network device, can be used by the network device to estimate an uplink channel (for example, (Physical Uplink Shared Channel (PUSCH)) between the terminal device and the network device. The network device can perform resource allocation and configure transmission parameters for uplink transmission over the uplink channel based on the result of the estimation. Prior to transmission of SRS, the network device may allocate one or more SRS resource sets to the terminal device for the SRS transmission. Each of the one or more SRS resource sets may include one or more SRS resources.

The terminal device may be equipped with multiple antennas for transmitting/receiving signals (for example, the SRS or any other signals) to/from the network device. With multiple antennas supported by the terminal device, SRS antenna switching can be supported. SRS antenna switching generally provides two distinct purposes: uplink transmission diversity for PUSCH, which may be either open loop or closed loop, and time division duplex (TDD) or frequency division duplex (FDD) downlink MIMO beamforming based on channel reciprocity. In the 3rd Generation Partnership Project (3GPP) specification for the fifth generation (5G) New Radio (NR), it has been agreed that 1T4R (that is, 1 transmit antenna and 4 receive antennas) antenna switching for SRS transmission can be supported by two aperiodic SRS resource sets. The two aperiodic SRS resource sets with total four SRS resources can be transmitted in different symbols of two different slots. Each SRS resource consists of a single SRS port, where the SRS port of each SRS resource is associated with a different antenna port of the terminal device. Each of the two SRS resource sets consists of two SRS resources, or one SRS resource set consists of a single SRS resource and the other SRS resource set consists of three SRS resources.

In case that the antenna switching for SRS transmission is enabled, a guard period may be required for SRS transmission, where the terminal device does not transmit any other signals, since the terminal device needs some time for switching antenna ports to transmit different signals. However, how to indicate the guard period required for SRS transmission have not been specified.

Embodiments of the present disclosure provide a solution for SRS transmission, so as to solve the problems above and one or more of other potential problems. With the solution, the guard periods prior to, subsequent to and/or between SRS resources can be supported. If the guard periods required for SRS transmission cannot be satisfied, one or more SRS resources may be dropped (which means no SRS transmission will be scheduled over the one or more SRS resources).

Principle and implementations of the present disclosure will be described in detail below with reference to FIGS. 1-11.

FIG. 1 shows an example communication network 100 in which implementations of the present disclosure can be implemented. The network 100 includes a network device 110 and a terminal device 120 served by the network device 110. The network 100 can provide at least one serving cell 102 to serve the terminal device 120. It is to be understood that the number of network devices, terminal devices and/or serving cells is only for the purpose of illustration without suggesting any limitations. The network 100 may include any suitable number of network devices, terminal devices and/or serving cells adapted for implementing implementations of the present disclosure.

In the communication network 100, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS to the terminal device 120 in a downlink. Similarly, the terminal device 120 may transmit a RS to the network device 110 in an uplink. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. Examples of the RS may include but are not limited to downlink or uplink Demodulation Reference Signal (DMRS), CSI-RS, Sounding Reference Signal (SRS), Phase Tracking Reference Signal (PTRS), Tracking Reference Signal (TRS), fine time-frequency Tracking Reference Signal (TRS), CSI-RS for tracking and so on.

In transmission of downlink and uplink RSs, the network device 110 may assign corresponding resources (also referred to as "RS resources") for the transmission and/or specify which RS sequence is to be transmitted. In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements of a resource region allocated for RS transmission in time, frequency, and/or code domains.

SRS can be used by the network device 110 to perform uplink channel estimation, so as to perform resource allocation and configure transmission parameters for UL transmission (such as, PUSCH transmission) from the terminal device 120 based on the result of the uplink channel estimation. SRS can also be divided into different types according to its behavior in time domain, such as P-SRS, AP-SRS and SP-SRS. As used herein, "P-SRS" refers to the SRS which is transmitted periodically in time domain. "SP-SRS" is similar to P-SRS except that the transmission of SP-SRS can be activated by a signal and deactivated by another signal. "AP-SRS" refers to the SRS whose transmission can be triggered by the network device via trigger signaling.

With multiple receive antenna ports and multiple/single transmit antenna ports supported by the terminal device 120, SRS antenna switching can be supported. For example, 1T4R (that is, 1 transmit antenna and 4 receive antennas) antenna switching for SRS transmission can be supported by two aperiodic SRS resource sets. The two aperiodic SRS resource sets with total four SRS resources can be transmitted in different symbols of two different slots. Each SRS resource consists of a single SRS port, where the SRS port of each SRS resource is associated with a different antenna port of the terminal device. Each of the two SRS resource sets consists of two SRS resources, or one SRS resource set consists of a single SRS resource and the other SRS resource set consists of three SRS resources. In case that the antenna switching for SRS transmission is enabled, a guard period may be required for SRS transmission, where the terminal device does not transmit any other signals, since the terminal device needs some time for switching antenna ports to transmit different signals.

Figure 2:
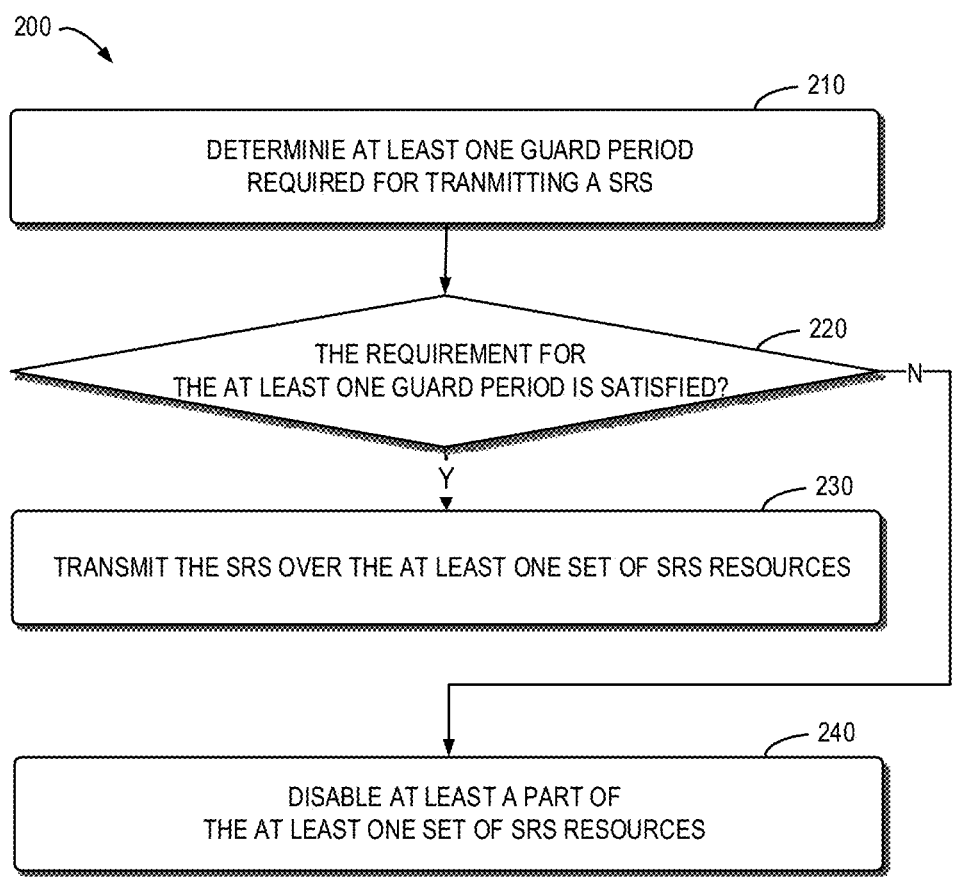
FIG. 2 shows a flowchart of an example method for SRS transmission according to some embodiments of the present disclosure.

FIG. 2 shows a flowchart of an example method 200 for SRS transmission in accordance with some embodiments of the present disclosure. The method 200 can be implemented at the terminal device 120 as shown in FIG. 1. It is to be understood that the method 200 may include additional blocks not shown and/or may omit some blocks as shown, and the scope of the present disclosure is not limited in this regard. For the purpose of discussion, the method 200 will be described from the perspective of the terminal device 120 with reference to FIG. 1.

At block 210, in response to at least one set of SRS resources being configured for transmitting a SRS to the network device 110 and antenna switching being enabled for the terminal device 120, the terminal device 120 determines at least one guard period required for transmitting the SRS. Uplink transmission to the network device 110 is expected to be scheduled outside the at least one guard period.

In some embodiments, the terminal device 120 may determine the at least one guard period based on a subcarrier spacing (SCS) of an uplink channel over which the SRS transmission and the uplink transmission are to be performed. In some embodiments, the at least one guard period required by the SRS transmission may include at least one of the following: a first guard period prior to the at least one set of SRS resources or prior to one of the at least one set of SRS resources; a second guard period subsequent to the at least one set of SRS resources or subsequent to one of the at least one set of SRS resources; and a third guard period between two SRS resources of the at least one set of SRS resources.

In some embodiments, for different configurations, the number of symbols for the first guard period prior to the at least one set of SRS resources or prior to one of the at least one set of SRS resources may be different. For example, in some embodiments, for different values of the SCS for SRS transmission, the number of symbols for the first guard period may be different.

In some embodiments, the number of symbols for first guard period prior to the at least one set of SRS resources or prior to one of the at least one set of SRS resources may be different from the number of symbols for the third guard period between two SRS resources of the at least one set of SRS resources.

In some embodiments, the number of symbols for first guard period prior to the at least one set of SRS resources or prior to one of the at least one set of SRS resources may be different from the number of symbols for the second guard periodic subsequent to the at least one set of SRS resources or subsequent to one of the at least one set of SRS resources.

In some embodiments, the first guard period prior to the at least one set of SRS resources or prior to one of the at least one set of SRS resources may be 0 or 1 symbol for different values of the SCS (for example, 15 kHz, 30 kHz, 60 kHz or 120 kHz). Specifically, in some embodiments, in case that the SCS is 15 kHz, 30 kHz, or 60 kHz, the first guard period prior to the at least one set of SRS resources or prior to one of the at least one set of SRS resources may be 0 symbol. In some other embodiments, in case that the SCS is 120 kHz, the first guard period prior to the at least one set of SRS resources or prior to one of the at least one set of SRS resources may be 1 symbol.

In some embodiments, for different configurations, the number of symbols for the second guard period subsequent to the at least one set of SRS resources or subsequent to one of the at least one set of SRS resources may be different. For example, in some embodiments, for different values of the SCS for SRS transmission, the number of symbols for the second guard period may be different.

In some embodiments, the number of symbols for the second guard period subsequent to the at least one set of SRS resources or subsequent to one of the at least one set of SRS resources may be different from the number of symbols for the third guard period between two SRS resources of the at least one set of SRS resources.

In some embodiments, the second guard period subsequent to the at least one set of SRS resources or subsequent to one of the at least one set of SRS resources may be 0 or 1 symbol for different values of the SCS (for example, 15 kHz, 30 kHz, 60 kHz or 120 kHz). Specifically, in some embodiments, in case that the SCS is 15 kHz, 30 kHz, or 60 kHz, the second guard period subsequent to the at least one set of SRS resources or subsequent to one of the at least one set of SRS resources may be 0 symbol. In some other embodiments, in case that the SCS is 120 kHz, the second guard period subsequent to the at least one set of SRS resources or subsequent to one of the at least one set of SRS resources may be 1 symbol.

In some embodiments, regarding the third guard period between two SRS resources of the at least one set of SRS resources, Table 1 shows the minimum guard period between two SRS resources of an SRS resource set for antenna switching as below.

TABLE 1

| The minimum guard period between Two SRS resources of an SRS resource set | |
|---|---|
| SCS (kHz) | Guard Period between the SRS resources |
| 15 | 1 |
| 30 | 1 |
| 60 | 1 |
| 120 | 2 |

Figure 3A:
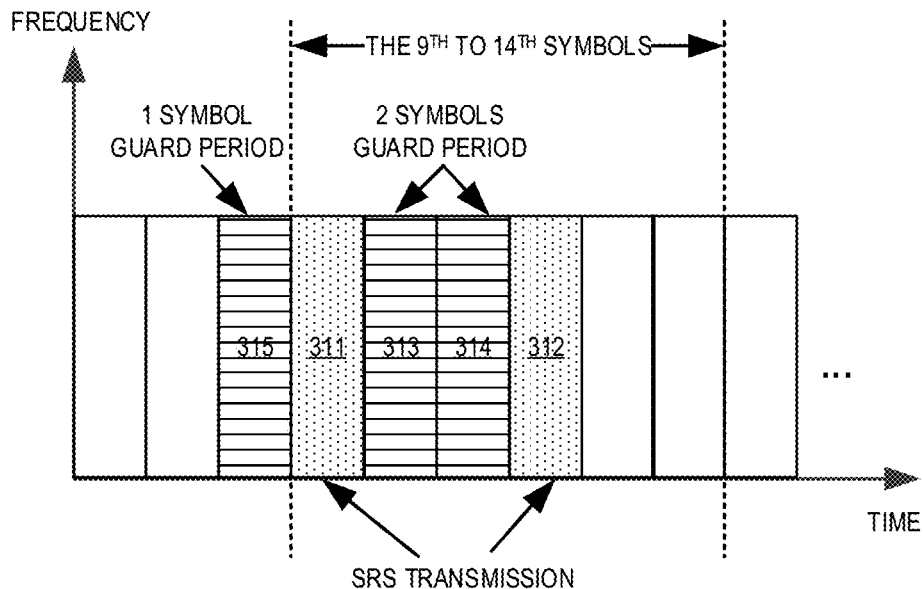
FIGS. 3A and 3B show examples of some embodiments of the present disclosure.
Figure 3B:
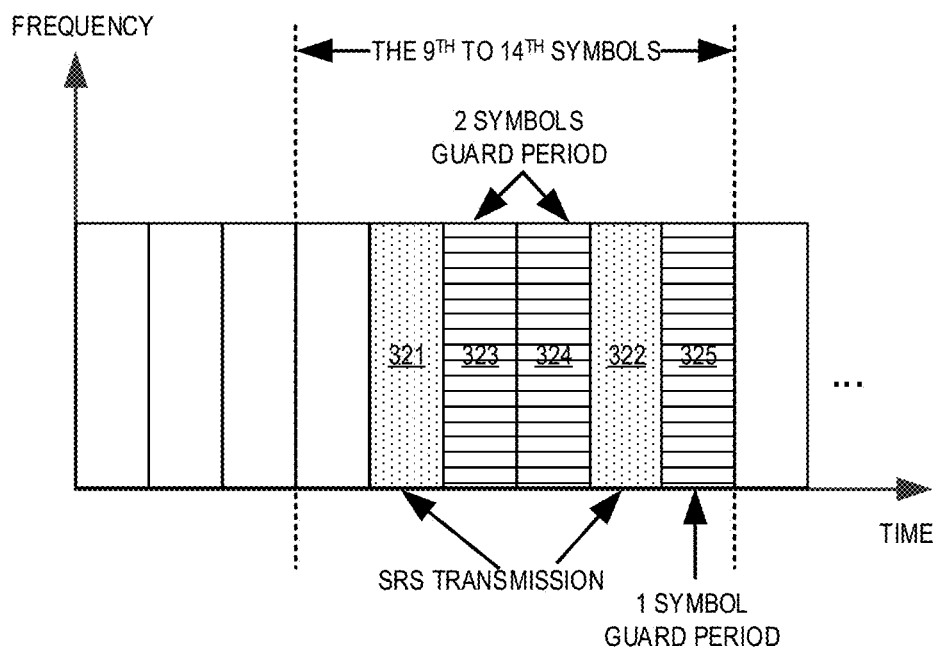

FIGS. 3A and 3B show examples of the guard periods for the SRS transmission in accordance with some embodiments of the present disclosure. In the examples as shown in FIGS. 3A and 3B, suppose that the SCS of the uplink channel is 120 kHz, and suppose that two SRS resource sets are configured for SRS transmission, each of which consists of two SRS resources. In case that one slot includes 14 symbols in total (which are the $1^{st}$ to $14^{th}$ symbols), the two SRS resources in one SRS resource set can be located within the last 6 symbols in one slot (which are the $9^{th}$ to $14^{th}$ symbols). As shown in FIG. 3A, the two SRS resources in one SRS resource set are located at the $9^{th}$ symbol 311 and the $12^{th}$ symbol 312 in one slot, respectively. The $10^{th}$ and $11^{th}$ symbols 313 and 314 are reserved as the guard period between the SRS resources 311 and 312. The $8^{th}$ symbol 315 may be reserved as the guard period prior to the SRS resource 311. As shown in FIG. 3B, the two SRS resources in one SRS resource set are located at the $10^{th}$ symbol 321 and the $13^{th}$ symbol 322 in one slot, respectively. The $11^{th}$ and $12^{th}$ symbols 323 and 324 are reserved as the guard period between the SRS resources 321 and 322. The $14^{th}$ symbol 325 may be reserved as the guard period subsequent to the SRS resource 322.

Figure 4:
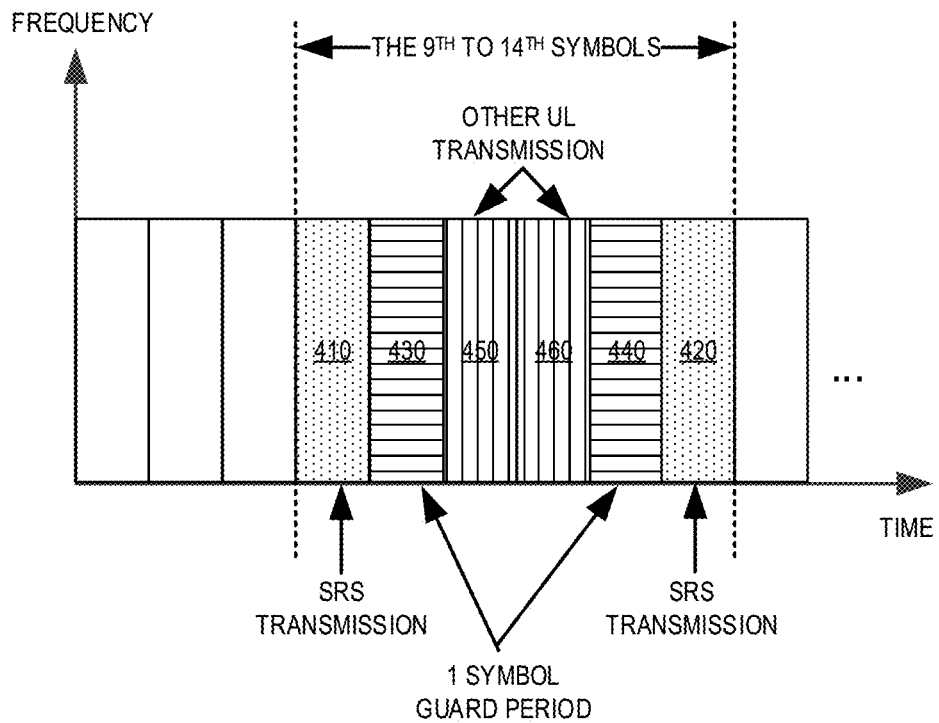
FIG. 4 shows an example of some embodiments of the present disclosure.

In some embodiments, there may be more than one symbol between SRS resources in one slot in case that the SCS is 15 kHz, 30 kHz or 60 kHz. In some embodiments, some symbols between SRS resources in one slot can be used for transmitting other uplink signals. FIG. 4 shows an example of such embodiment. In the example as shown in FIG. 4, suppose that the SCS of the uplink channel is 15 kHz, 30 kHz or 60 kHz, and suppose that two SRS resource sets are configured for SRS transmission, each of which consists of two SRS resources. In case that one slot includes 14 symbols in total (which are the $1^{st}$ to $14^{th}$ symbols), the two SRS resources in one SRS resource set can be located within the last 6 symbols in one slot (which are the $9^{th}$ to $14^{th}$ symbols). As shown in FIG. 4, the two SRS resources in one SRS resource set are located at the 9$^{th}$ symbol 410 and the 14$^{th}$ symbol 420 in one slot, respectively. The 10$^{th}$ symbol 430 can be reserved as the guard period subsequent to the SRS resource 410, and the 13$^{th}$ symbol 440 can be reserved as the guard period prior to the SRS resource 420. The 11$^{th}$ and 12$^{th}$ symbols 450 and 460 can be used for transmitting other uplink signals.

In some embodiments, 120 kHz SCS may be configured for SRS transmission. In this case, if there is other UL/DL transmission configured prior to the SRS resources in one slot and/or there is other UL/DL transmission configured subsequent to the SRS resources in the subsequent slot, there may be only one pattern for SRS resources transmission within the slot. For example, the 9$^{th}$ symbol can be reserved as the guard period prior to the SRS resources. The 10$^{th}$ symbol can be configured for SRS resource transmission. The 11$^{th}$ and 12$^{th}$ symbols can be reserved as the guard period between the SRS resources. The 13$^{th}$ symbol can be configured for SRS resource transmission, and the 14$^{th}$ symbol can be reserved as the guard period subsequent to the SRS resources.

In some embodiments, there may be more than two symbols between SRS resources in one slot in case that the SCS is 120 kHz. In some embodiments, no matter how many symbols there are between SRS resources in one slot, no uplink transmission may be scheduled within these symbols between the SRS resources in one slot. In some embodiments, in case that the SCS is 120 kHz, if uplink transmission is scheduled within the symbols between SRS resources in one slot, the SRS resources will be dropped (that is, no SRS transmission will be scheduled over the SRS resources).

In some embodiments, if there is uplink transmission scheduled between SRS resources in one slot, some requirements may need to be satisfied. For example, the requirements may include that the time interval between the two SRS resources in one slot should be equal to or greater than K symbols, where K=3 or 4. Alternatively, or in addition, the requirements may include that the SCS should be 15 kHz, 30 kHz or 60 kHz only, but cannot be 120 kHz. Alternatively, or in addition, the requirements may include that the number of symbols for one SRS resource may be only 1. Alternatively, or in addition, the requirements may include that there should be a guard period (at least one symbol) between SRS transmission and other UL transmission.

Figure 5:
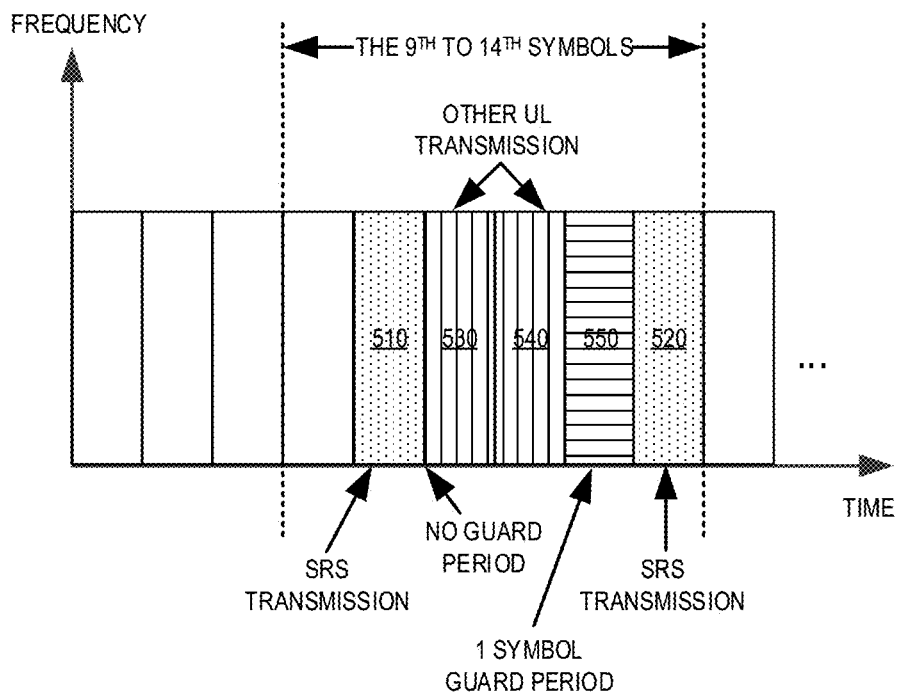
FIG. 5 shows an example of some embodiments of the present disclosure.

In some embodiments, as described above, there may be more than one symbol between SRS resources in one slot in case that the SCS is 15 kHz, 30 kHz or 60 kHz, and there may be more than two symbols between SRS resources in one slot in case that the SCS is 120 kHz. In some embodiments, some symbols between SRS resources in one slot can be used for transmitting other uplink signals. In some embodiments, if one SRS resource and the transmission of other uplink signals are associated with a same configuration about a transmit (TX) antenna of the terminal device 120 (such as, a same TX beam or same TX spatial filter), there may be no guard period between the SRS resource and the transmission of other uplink signals, while a guard period should be reserved between the transmission of other uplink signals and the other SRS resource in this slot. FIG. 5 shows an example of such embodiment. In the example as shown in FIG. 5, suppose that two SRS resource sets are configured for SRS transmission, each of which consists of two SRS resources. In case that one slot includes 14 symbols in total (which are the 1$^{st}$ to 14$^{th}$ symbols), the two SRS resources in one SRS resource set can be located at the last 6 symbols in one slot (which are the 9$^{th}$ to 14$^{th}$ symbols). As shown in FIG. 5, the two SRS resources in one SRS resource set are located at the 10$^{th}$ symbol 510 and the 14$^{th}$ symbol 520 in one slot, respectively. The 11$^{th}$ symbol 530 and/or the 12$^{th}$ symbols 540 can be used for transmitting other uplink signals, if the SRS resource 510 and the transmission of other uplink signals are associated with a same TX beam or same TX spatial filter. That is, there is no guard period between the SRS resource 510 and the transmission of other uplink signals. In addition, the 13$^{th}$ symbol 550 may be reserved as the guard period between the transmission of other uplink signals and the SRS resource 520.

Returning to FIG. 2, at block 220, the terminal device 120 determines whether the requirement for the at least one guard period is satisfied. If the requirement is satisfied, that is, the uplink transmission is scheduled outside the at least one guard period, the terminal device 120 transmits the SRS to the network device 110 over the at least one set of SRS resources at block 230. If the requirement is not satisfied, that is, the uplink transmission is scheduled within the at least one guard period, the terminal device 120 disables (drops) at least a part of the at least one set of SRS resources for SRS transmission at block 240.

In some embodiments, if uplink transmission with higher priority than the SRS transmission is scheduled within the at least one guard period, the terminal device 120 may determine one or more SRS resource in the at least one set of SRS resources to be dropped. For example, the terminal device 120 may determine the one or more SRS resource based on at least one of the following: a type of the SRS to be transmitted; an antenna pattern of the terminal device 120; and the SCS of the uplink channel. For example, the type of the SRS may indicate whether the SRS is periodic, semi-persistent or aperiodic. The antenna pattern of the terminal device 120 may include one of 1T4R, 1T2R, 2T4R, 1T8R, 2T8R, and so on. The SCS of the uplink channel may be one of 15 kHz, 30 kHz, 60 kHz, 120 kHz and so on.

In some embodiments, if uplink transmission with higher priority than the SRS transmission is scheduled within the at least one guard period, the terminal device 120 may drop all of the at least one set of SRS resources for one time (that is, one time of transmission over all of the at least one set of SRS resources). For example, in some embodiments, if the SRS may be periodic or semi-persistent. In this case, if the antenna pattern of the terminal device 120 is 1T2R or 2T4R, one SRS resource set with total two SRS resources may be dropped; and if the antenna pattern of the terminal device 120 is 1T4R as described above, two SRS resource set with total four SRS resources may be dropped. In some other embodiments, the SRS may be aperiodic. In this case, if antenna pattern of the terminal device 120 is 1T2R, one SRS resource set with total two SRS resources may be dropped; and if the antenna pattern of the terminal device 120 is 1T4R as described above, two SRS resource set with total four SRS resources may be dropped.

In some embodiments, if uplink transmission with higher priority than the SRS transmission is scheduled within the at least one guard period, the terminal device 120 may only drop some of the at least one set of SRS resources colliding with the at least one guard period, until the guard period required for SRS transmission over the remaining SRS resources can be satisfied.

Figure 6A:
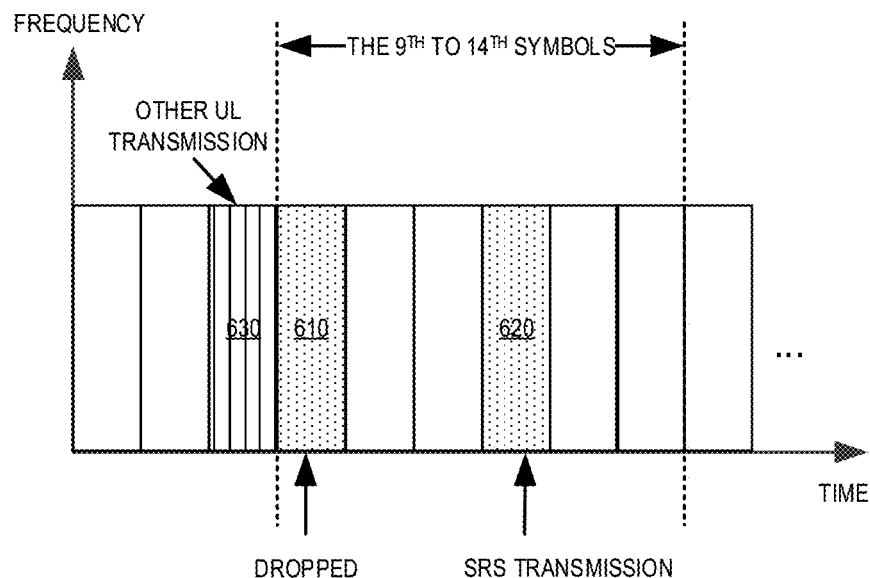
FIGS. 6A and 6B show examples of some embodiments of the present disclosure.
Figure 6B:
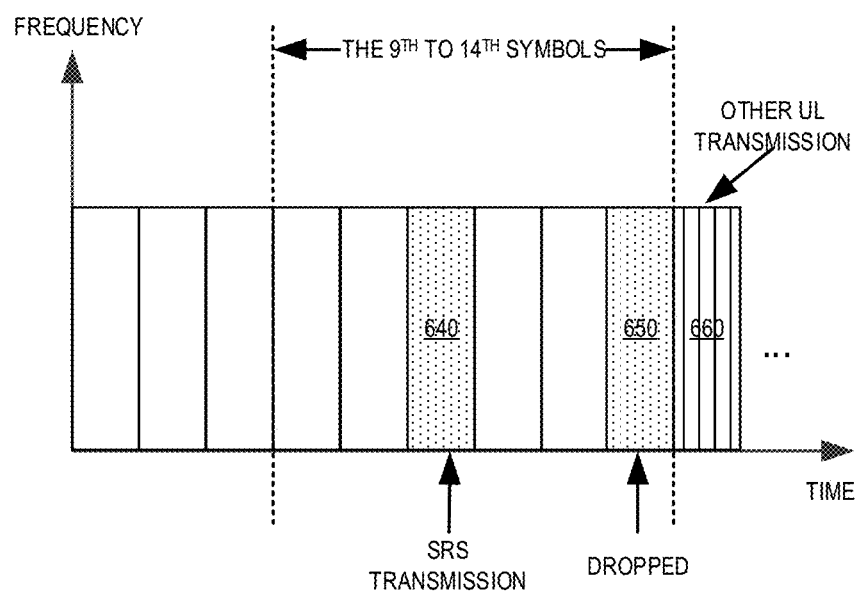

FIGS. 6A and 6B show examples of such embodiments. In the examples as shown in FIGS. 6A and 6B, suppose that two SRS resource sets are configured for SRS transmission, each of which consists of two SRS resources. In case that one slot includes 14 symbols in total (which are the 1$^{st}$ to 14$^{th}$ symbols), the two SRS resources in one SRS resource set can be located at the last 6 symbols in one slot (which are the 9$^{th}$ to 14$^{th}$ symbols). As shown in FIG. 6A, the two SRS resources in one SRS resource set are located at the 9$^{th}$ symbol 610 and the 12$^{th}$ symbol 620 in one slot, respectively. The 8$^{th}$ symbol 630 is used for transmitting other uplink signals with higher priority than the SRS. In this case, the SRS resource 610 may be dropped, since there is no guard period between the transmission of other uplink signals in the 8$^{th}$ symbol 630 and the SRS transmission in the 9$^{th}$ symbol. As shown in FIG. 6B, the two SRS resources in one SRS resource set are located at the 11$^{th}$ symbol 640 and the 14$^{th}$ symbol 650 in one slot, respectively. The 1$^{st}$ symbol 660 of the next slot is used for transmitting other uplink signals with higher priority than the SRS. In this case, the SRS resource 650 may be dropped, since there is no guard period between the transmission of other uplink signals in the 14$^{th}$ symbol 650 in this slot and the SRS transmission in the 1$^{st}$ symbol 660 of the next slot.

In some embodiments, if a SRS resource in one SRS resource set is determined to be dropped, but the transmission of other uplink signals (which have higher priority than the SRS) and the SRS resource are associated with a same configuration of a transmit antenna of the terminal device 120 (for example, a same QCL or TX spatial filter), the SRS resource may not be dropped. That is, SRS transmission over the SRS resource can be performed.

In some embodiments, if uplink transmission with higher priority than the SRS transmission is scheduled within the at least one guard period, the terminal device 120 may only drop a SRS resource set colliding with the at least one guard period, until the guard period required for SRS transmission over the remaining SRS resource sets can be satisfied. For example, in case that the SRS to be transmitted is aperiodic and the antenna pattern of the terminal device 120 is 1T4R, two aperiodic SRS resource sets may be configured for SRS transmission. If the required guard period between one of the two SRS resource sets and the transmission for other uplink signals cannot be satisfied, the SRS resource set may be dropped. Further, if the required guard period between the other of the two SRS resource sets and the transmission for other uplink signals can be satisfied, SRS transmission over the other SRS resource set can be performed.

In some embodiments, if the SCS of the uplink channel is 120 kHz and the antenna pattern of the terminal device 120 is 1T4R, two aperiodic SRS resource sets with total four SRS resources may be configured for SRS transmission, and each of the two SRS resource set may consist of two SRS resources. That is, one SRS resource set with one SRS resource and the other SRS resource set with three SRS resources may be not available for this case.

In some embodiments, if uplink transmission with higher priority than the SRS transmission is scheduled within the at least one guard period, the terminal device 120 may determine one or more SRS resource in the at least one set of SRS resources to be dropped based on a predetermined dropping rule. In some embodiments, for different configurations for SRS transmission, the dropping rule may be different. In some embodiments, for example, the dropping rule for periodic or semi-persistent SRS antenna switching may be different from that for aperiodic SRS antenna switching. In some embodiments, for periodic or semi-persistent SRS antenna switching, the dropping may be based on a SRS resource or a SRS resource set. For aperiodic SRS antenna switching, the dropping may be based on a SRS resource set or all of the SRS resource sets configured for SRS transmission. In some embodiments, for periodic or semi-persistent SRS antenna switching, if the guard period required for one SRS resource cannot be satisfied, this SRS resource or the SRS resource set including this SRS resource may be dropped. In some embodiments, for aperiodic SRS antenna switching, if the guard period required for one SRS resource set cannot be satisfied, this SRS resource set or all of the SRS resource sets configured for SRS transmission may be dropped.

Figure 7A:
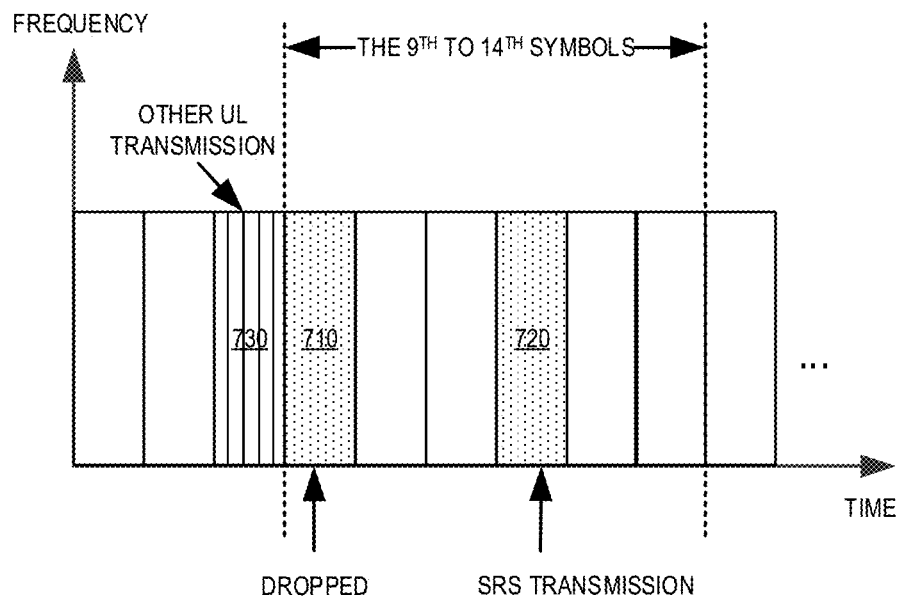
FIGS. 7A and 7B show examples of some embodiments of the present disclosure.
Figure 7B:
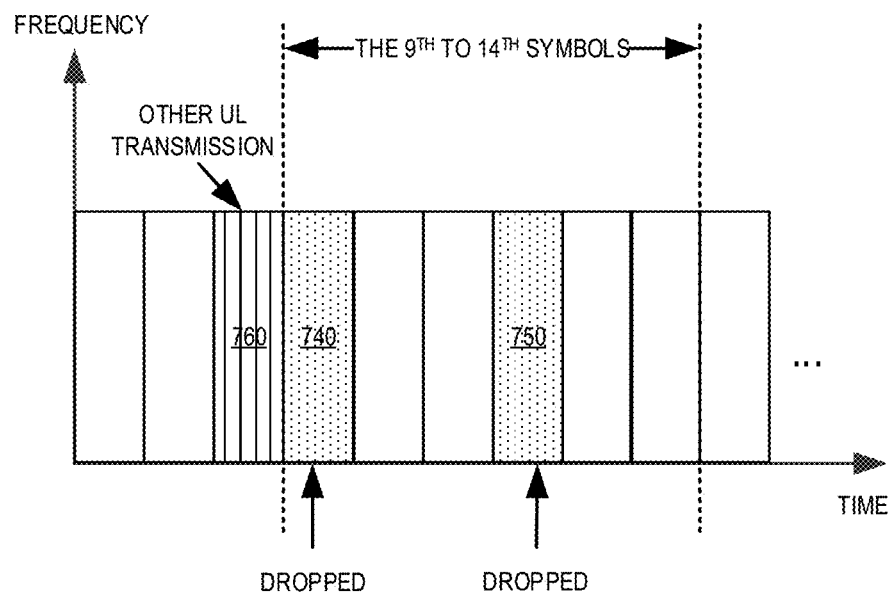

FIGS. 7A and 7B show examples of such embodiments. In the examples as shown in FIGS. 7A and 7B, suppose that two SRS resource sets are configured for SRS transmission, each of which consists of two SRS resources. In case that one slot includes 14 symbols in total (which are the 1$^{st}$ to 14$^{th}$ symbols), the two SRS resources in one SRS resource set can be located at the last 6 symbols in one slot (which are the 9$^{th}$ to 14$^{th}$ symbols). FIG. 7A shows an example of periodic or semi-persistent SRS antenna switching. As shown in FIG. 7A, the two SRS resources in one SRS resource set are located at the 9$^{th}$ symbol 710 and the 12$^{th}$ symbol 720 in one slot, respectively. The 8$^{th}$ symbol 730 is used for transmitting other uplink signals with higher priority than the SRS. In this case, the SRS resource 710 may be dropped, since there is no guard period between the transmission of other uplink signals in the 8$^{th}$ symbol 730 and the SRS transmission in the 9$^{th}$ symbol 710. FIG. 7B shows an example of aperiodic SRS antenna switching. As shown in FIG. 7B, the two SRS resources in one SRS resource set are located at the 9$^{th}$ symbol 740 and the 12$^{th}$ symbol 750 in one slot, respectively. The 8$^{th}$ symbol 760 is used for transmitting other uplink signals with higher priority than the SRS. In this case, the SRS resources 740 and 750 may be dropped.

In some embodiments, the SCS for SRS transmission may be different from that for other uplink transmission within the same bandwidth part (BWP), within the same carrier component (CC) or within the same slot. For example, the SCS (also referred to as "second SCS") for SRS transmission may be greater than the SCS (also referred to as "first SCS") for other uplink transmission. For example, the other uplink transmission may be PUSCH or PUCCH. For example, in case that one slot includes 14 symbols in total (which are the 1$^{st}$ to 14$^{th}$ symbols), SRS resources configured for SRS transmission can be located at the last 6 symbols in one slot (which are the 9$^{th}$ to 14$^{th}$ symbols). The SCS for other uplink transmission may be represented as "S0". The SCS for SRS transmission may be represented as "S1". In some embodiments, S1≥S0. Specifically, in some embodiments, S1=K*S0, where K is a natural number. This means that the actual number of symbols for SRS transmission can be more. For example, if up to L symbols are allocated for SRS transmission and S1=K*S0, there will be up to K*L symbols for SRS transmission.

Figure 8A:
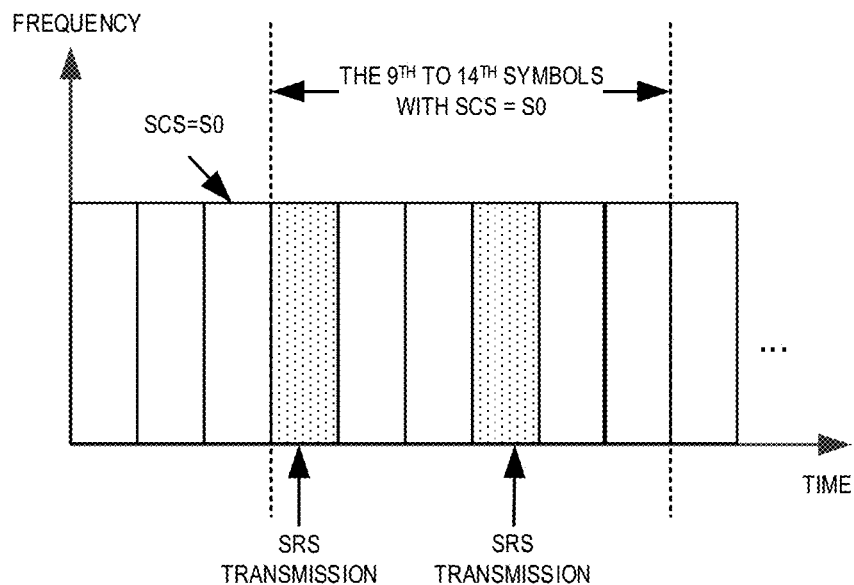
FIGS. 8A-8C show examples of some embodiments of the present disclosure.
Figure 8B:
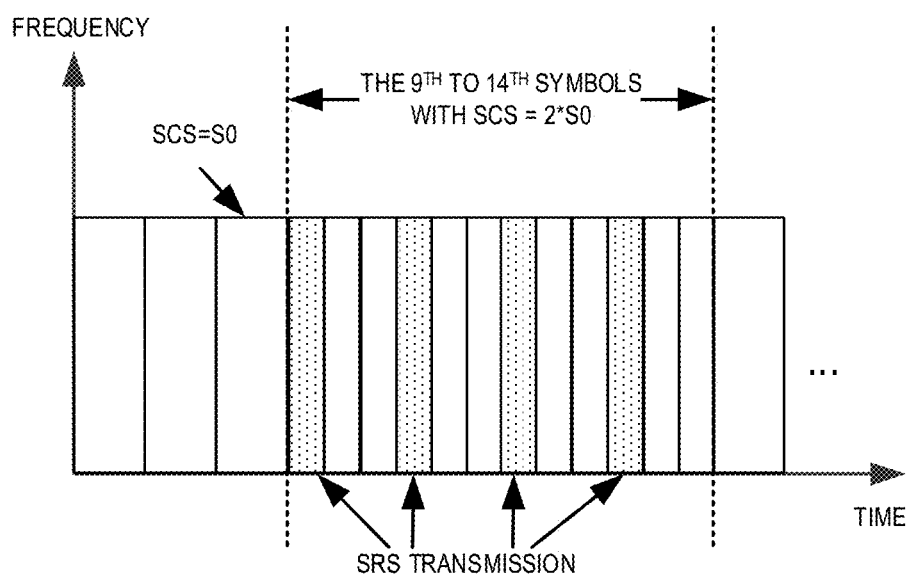
Figure 8C:
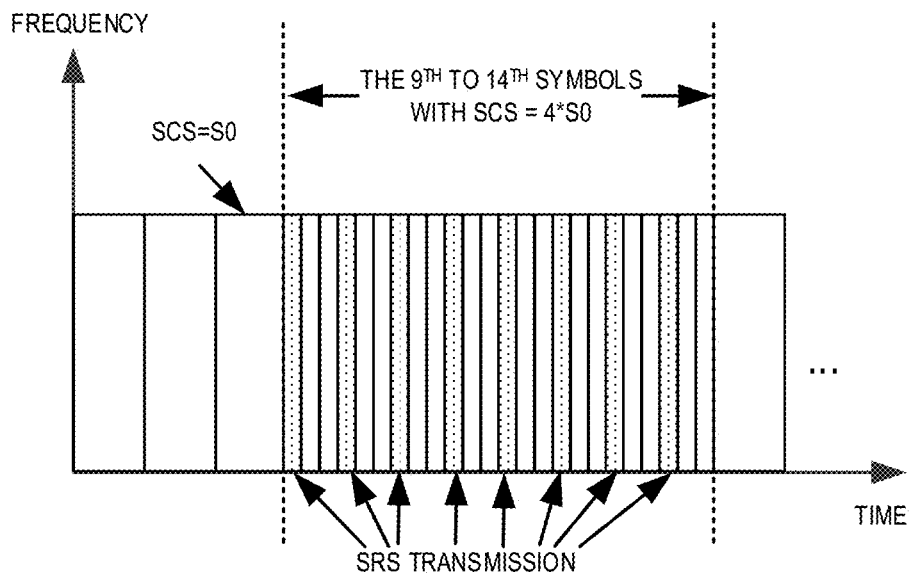

FIGS. 8A-8C shows examples of such embodiments. In the examples as shown in FIGS. 8A to 8C, suppose that the SCS for SRS transmission is S1, while the SCS for other uplink transmission is S0, where S1=K*S0 and K is a natural number. In the example as shown in FIG. 8A, S1=S0. As shown in FIG. 8A, SRS can be transmitted in two symbols in one slot, which are the 9$^{th}$ symbol and the 12$^{th}$ symbol. In the example as shown in FIG. 8B, S1=2*S0. As shown in FIG. 8B, SRS can be actually transmitted in four symbols in one slot. In the example as shown in FIG. 8C, S1=4*S0. As shown in FIG. 8C, SRS can be actually transmitted in 8 symbols in one slot.

In current 3GPP specifications, a start position (that is, a symbol offset with relative to the 9$^{th}$ symbol) which indicates the starting symbol for SRS transmission in one slot can be any of 0, 1, 2, . . . , 5. This start position can be indicated to the terminal device 120 prior to the SRS transmission. In some embodiments, one parameter indicating the SCS (that is, S1) for SRS transmission can be indicated. In some embodiments, the terminal device 120 may be not expected to be configured with a smaller SCS for SRS transmission than the SCS for other uplink transmission. That is, the terminal device 120 may be not expected to be configured with S1, where S1<S0. In some embodiments, one parameter related to the SCS for SRS transmission can be indicated in addition to the start position. For example, the parameter K which indicates S1=K*S0 (where S1 represents the SCS for SRS transmission and S0 represents the SCS for other uplink transmission) can be indicated in addition to the start position. For example, K can be any of 1, 2, 4 and 8. In some embodiments, for different values of S0, respective values of K may be different. For example, if S0 is 15 kHz, K can be any of 1, 2, 4 and 8. For example, if S0 is 30 kHz, K can be any of 1, 2 and 4. For example, if S0 is 60 kHz, K can be 1 or 2. For example, if S0 is 120 kHz, K can be 1 or there may be no need to indicate the parameter K in this case. As such, for 1T4R SRS antenna switching, only one SRS resource set, instead of two SRS resource sets in 3GPP specifications, will be enough for SRS transmission.

In some embodiments, for one time of SRS transmission (that is, all of the SRS resource sets are transmitted for one time), there may be M sets of SRS resources, where M is an integer and M>1. The M set of SRS resources may be triggered by M trigger signals respectively. For example, one trigger signal may trigger the transmission over a respective set of SRS resources. However, there may be a time offset between the trigger signal and the transmission over the respective set of SRS resources. In some embodiments, in the case as described above, a time window or time period can be configured or predetermined for the reception of the M trigger signals. For example, if the M trigger signals cannot be received within the time window or time period, all of the SRS resource sets configured for SRS transmission may be dropped. As another example, if any of the M trigger signals cannot be received prior to the SRS transmission (for example, the transmission over the earliest one of the M SRS resource sets), all of the M SRS resource sets will be dropped.

In some embodiments, for SRS antenna switching, there may be M SRS resource sets (where M is an integer and M>1), which may be triggered by M DCIs respectively. In some embodiments, if any of the M DCIs cannot be received prior to the SRS transmission (for example, the transmission over the earliest one of the M SRS resource sets), the terminal device 120 may be not expected to transmit the SRS over the M SRS resource sets. In some embodiments, a time window or time period can be configured or predetermined for the reception of the M trigger signals. For example, the time window or time period for the reception of different DCI is represented as N slots, microseconds or symbols. In some embodiments, the time window or time period may start from the first or last symbol of the first reception of DCI within the M DCIs. In some embodiments, if the M DCIs cannot be received within the time window or time period, the terminal device 120 may be not expected to transmit the SRS over the M SRS resource sets. In some embodiments, the value of N may be different in different cases (for example, different SCSs for SRS transmission).

In some embodiments, for 1T4R SRS antenna switching, the at least one set of SRS resources configured for SRS transmission may include a first SRS resource set and a second SRS resource set. First SRS transmission over the first SRS resource set may be triggered by first DCI, while second SRS transmission over the second SRS resource set may be triggered by second DCI. For example, the first SRS transmission is prior to the second SRS transmission. In some embodiments, in response to failing to receiving the second DCI from the network device 110 prior to the first SRS transmission, both the first and second SRS resource sets will be dropped. In some other embodiments, in response to failing to receiving the second DCI from the network device 110 within the predetermined or configured time period or time window, both the first and second SRS resource sets will be dropped. For example, the predetermined or configured time period or time window may start from the first or last symbol of the reception of the first DCI.

In some embodiments, for one time of TRS reception (that is, all of the TRS resource sets are received for one time), there may be M sets of TRS resources, where M is an integer and M>1. The M set of TRS resources may be triggered by M trigger signals respectively. For example, one trigger signal may trigger the reception over a respective set of TRS resources. However, there may be a time offset between the trigger signal and the reception over the respective set of TRS resources. In some embodiments, in the case as described above, a time window or time period can be configured or predetermined for the reception of the M trigger signals. For example, if the M trigger signals cannot be received within the time window or time period, all of the TRS resource sets configured for TRS reception may be dropped. As another example, if any of the M trigger signals cannot be received prior to the TRS reception (for example, the reception over the earliest one of the M TRS resource sets), all of the M TRS resource sets will be dropped. In some embodiments, if a slot offset configured between the reception over two sets of TRS resources is not 0, all of the M TRS resource sets will be dropped. Alternatively, in some embodiments, if the slot offset configured between the receptions over two sets of TRS resources is not 1 or is greater than a threshold T, all of the M TRS resource sets will be dropped. For example, the threshold T may be 1 or 2 slot(s).

Figure 9A:
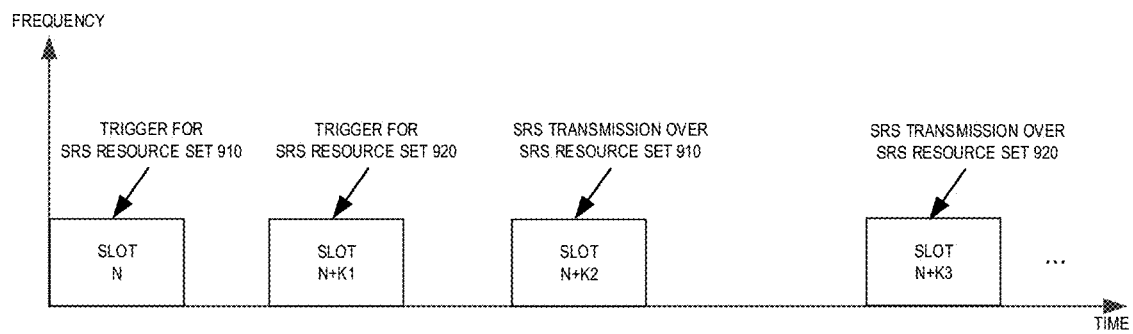
FIGS. 9A-9C show examples of some embodiments of the present disclosure.
Figure 9B:
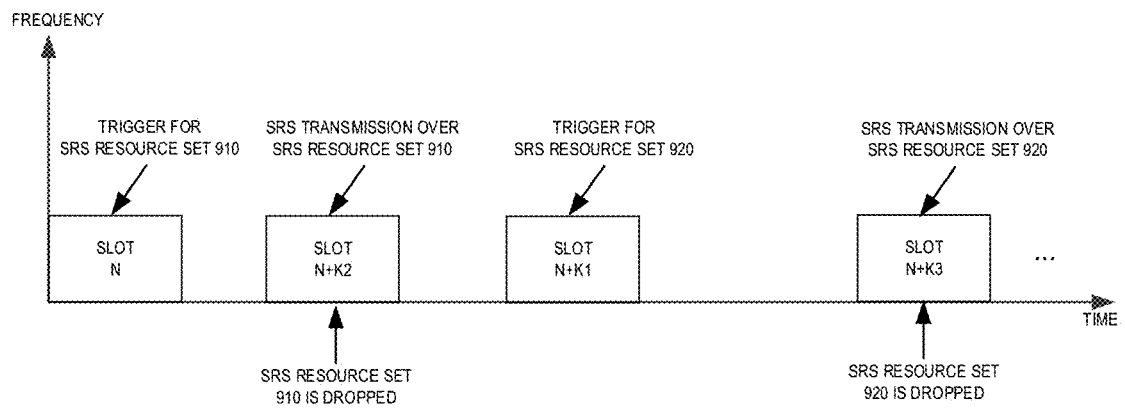
Figure 9C:
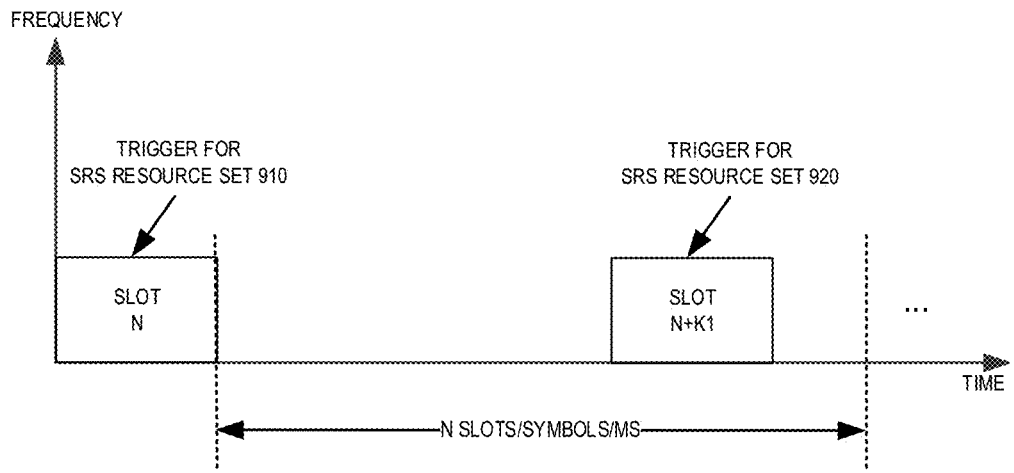

FIGS. 9A-9C shows examples of such embodiments. In the examples as shown in FIGS. 9A-9C, suppose that two SRS resources sets 910 and 920 are configured for SRS transmission. In one time of SRS transmission, SRS transmission over the SRS resource set 910 is prior to SRS transmission over the SRS resource set 920. FIG. 9A shows a normal case where no SRS resource set is dropped. As shown in FIG. 9A, the trigger (for example, the DCI) for the SRS resource set 910 is received in slot n, while the trigger for the SRS resource set 920 is received in slot N+K1, where K1 is a natural number. In one time of SRS transmission, SRS transmission over the SRS resource set 910 is performed in slot N+K2, where K2>K1. SRS transmission over the SRS resource set 920 is performed in slot N+K3, where K3>K2. FIG. 9B shows a different case than FIG. 9A. As shown in FIG. 9B, the trigger for the SRS resource set 910 is received in slot n, and SRS transmission over the SRS resource set 910 is to be scheduled in slot N+K1, where K1 is a natural number. The trigger for the SRS resource set 920 is received in slot N+K2, and SRS transmission over the SRS resource set 920 is to be scheduled in slot N+K3, where K2<K3. However, as shown in FIG. 9B, K2<K1, which means that the trigger for the SRS resource set 920 cannot be received prior to the SRS transmission over the SRS resource set 910. In this case, the two SRS resources sets 910 and 920 may be dropped. That is, the terminal device 120 may not be expected to transmit SRS over the two SRS resources sets 910 and 920. FIG. 9C shows an example of another case in accordance with some embodiments. As shown in FIG. 9C, the trigger of the SRS resource set 910 is received in slot n, and the trigger for the other SRS resource set 920 is expected to be received within the time window of N slots/symbols/ms. If the trigger for the other SRS resource set 920 cannot be received within the N slots/symbols/ms, both of the two SRS resource sets may be dropped.

Although only two SRS resource sets for 1T4R antenna switching are illustrated above as examples of some embodiments of the present disclosure, it is to be understood that for different antenna patterns of the terminal device 120, different number of SRS resource sets can be configured for SRS antenna switching. For example, in some embodiments, 3 or 4 SRS resource sets can be configured for 1T8R SRS transmission. The scope of the present disclosure will not be limited in this regard.

Figure 10:
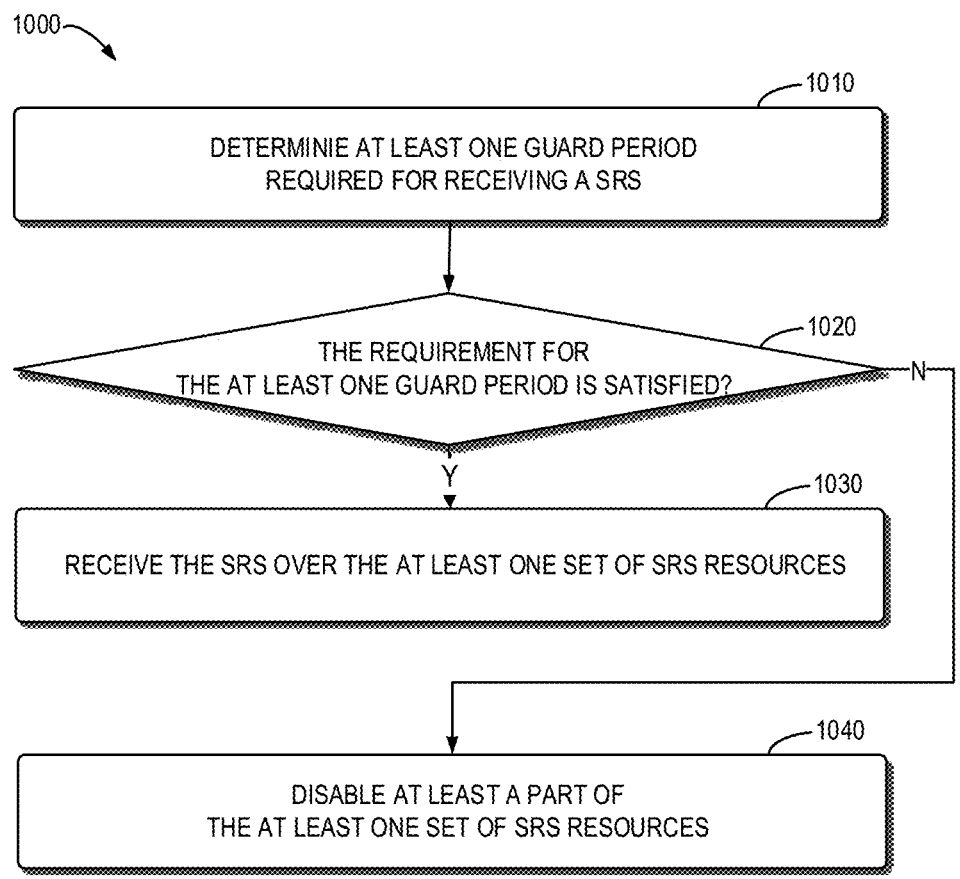
FIG. 10 shows a flowchart of an example method for SRS transmission according to some embodiments of the present disclosure.

FIG. 10 shows a flowchart of an example method 1000 in accordance with some embodiments of the present disclosure. The method 1000 can be implemented at the network device 110 as shown in FIG. 1. It is to be understood that the method 1000 may include additional blocks not shown and/or may omit some blocks as shown, and the scope of the present disclosure is not limited in this regard. For the purpose of discussion, the method 1000 will be described from the perspective of the network device 110 with reference to FIG. 1. It is also to be understood that the method 1000 performed by the network device 110 may correspond to the method performed by the terminal device as described above with respect to FIGS. 2-9. For the purpose of simplification, some details about the method 1000 will be omitted here.

At block 1010, in response to at least one set of sounding reference signal (SRS) resources being configured for receiving a SRS from the terminal device 120 and antenna switching being enabled for the terminal device 120, the network device 110 determines at least one guard period required for receiving the SRS. Uplink reception from the terminal device 120 may be expected to be scheduled outside the at least one guard period.

In some embodiments, the network device 110 may determine the at least one guard period based on a subcarrier spacing of an uplink channel.

In some embodiments, the network device 110 may determine at least one of the following: a first guard period prior to the at least one set of SRS resources; a second guard period subsequent to the at least one set of SRS resources; and a third guard period between two SRS resources of the at least one set of SRS resources.

In some embodiments, in response to the uplink reception and a first SRS resource in the at least one set of SRS resources being associated with a same configuration about a transmit antenna of the terminal device, the network device 110 may determine that no guard period is required between the uplink reception and SRS reception over the first SRS resource.

At block 1020, the network device 110 determines whether the requirement for the at least one guard period is satisfied. If the requirement is satisfied, that is, the uplink reception is scheduled outside the at least one guard period, the network device 110 receives the SRS from the terminal device 120 over the at least one set of SRS resources at block 1030.

In some embodiments, the network device 110 may determine a first subcarrier spacing for the uplink reception.

The network device 110 may determine a second subcarrier spacing for receiving the SRS based on the first subcarrier spacing, which is a multiple of the first subcarrier spacing. The network device 110 may receive the SRS from the terminal device 120 based on the second subcarrier spacing.

If the requirement is satisfied, that is, the uplink reception is scheduled within the at least one guard period, the network device 110 disables at least a part of the at least one set of SRS resources for receiving the SRS at block 1040.

In some embodiments, the network device 110 may determine one or more SRS resources in the at least one set of SRS resources to be disabled and then disable the one or more SRS resources for receiving the SRS.

In some embodiments, the network device 110 may determine the one or more SRS resources to be disabled based on at least one of the following: a type of the SRS; an antenna pattern of the terminal device; and a subcarrier spacing of an uplink channel.

In some embodiments, the type of the SRS indicates whether the SRS is periodic, semi-persistent or aperiodic.

In some embodiments, in response to the uplink reception and a second SRS resource in the at least one set of SRS resources being associated with a same configuration about a transmit antenna of the terminal device, the network device 110 may exclude the second SRS resource from the one or more SRS resources.

It can be seen that, embodiments of the present disclosure provide a solution for SRS transmission. With the solution, the guard periods prior to, subsequent to or between SRS resources can be supported. If the guard periods required for SRS transmission cannot be satisfied, one or more SRS resources may be dropped (which means no SRS transmission will be scheduled over the one or more SRS resources).

Figure 11:
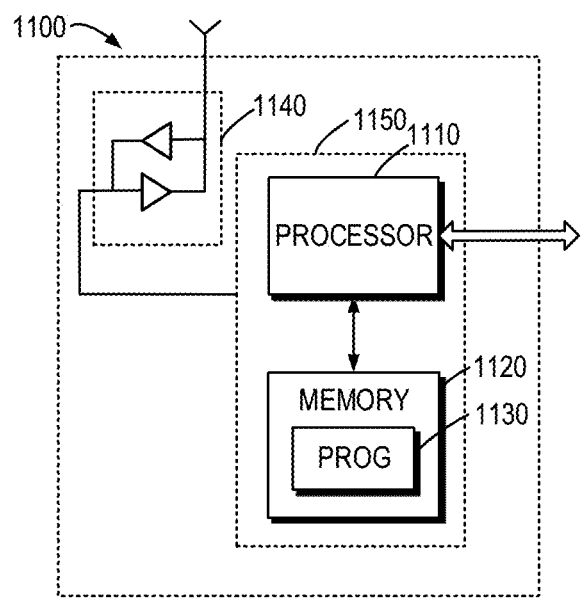
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the network device 110 as shown in FIG. 1. Accordingly, the device 1100 can be implemented at or as at least a part of the network device 110.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 1 to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 and 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:

in response to at least one set of sounding reference signal (SRS) resources being configured for transmitting a SRS to a network device and antenna switching being enabled for the terminal device, determining at least one guard period required for transmitting the SRS, wherein uplink transmission to the network device is conditioned to be scheduled outside the at least one guard period;

in response to the uplink transmission being scheduled outside the at least one guard period, transmitting the SRS to the network device over the at least one set of SRS resources; and in response to the uplink transmission being scheduled within the at least one guard period, disabling at least a part of the at least one set of SRS resources for transmitting the SRS, wherein the disabling at least a part of the at least one set of SRS resources for transmitting the SRS comprises:

determining one or more SRS resources in the at least one set of SRS resources to be disable; and disabling the one or more SRS resources for transmitting the SRS, wherein the determining one or more SRS resources comprises, in response to the uplink transmission and a second SRS resource in the at least one set of SRS resources being associated with a same configuration about a transmit antenna of the terminal device, excluding the second SRS resource from the one or more SRS resources.

2. The method of claim 1, wherein the determining at least one guard period comprises:
determining the at least one guard period based on a subcarrier spacing of an uplink channel.

3. The method of claim 1, wherein the determining at least one guard period comprises:
determining at least one of the following:
a first guard period prior to the at least one set of SRS resources;
a second guard period subsequent to the at least one set of SRS resources; and
a third guard period between two SRS resources of the at least one set of SRS resources.

4. The method of claim 1, wherein the determining one or more SRS resources comprises:
determining the one or more SRS resources to be disabled based on at least one of the following:
a type of the SRS;
an antenna pattern of the terminal device; and
a subcarrier spacing of an uplink channel.

5. The method of claim 4, wherein the type of the SRS indicates whether the SRS is periodic, semi-persistent or aperiodic.

6. The method of claim 1, wherein the transmitting the SRS comprises:
determining a first subcarrier spacing for the uplink transmission;
determining a second subcarrier spacing for transmitting the SRS based on the first subcarrier spacing, the second subcarrier spacing being a multiple of the first subcarrier spacing; and
transmitting the SRS to the network device based on the second subcarrier spacing.

7. The method of claim 1, wherein the at least one set of SRS resources include at least a first set of SRS resources and a second set of SRS resources, first SRS transmission over the first set of SRS resources triggered by first Downlink Control Information (DCI) transmitted from the network device to the terminal device being prior to second SRS transmission over the second set of SRS resources triggered by second DCI transmitted from the network device to the terminal device, and wherein the disabling at least a part of the at least one set of SRS resources for transmitting the SRS comprises:
in response to failing to receiving the second DCI from the network device prior to the first SRS transmission, disabling the at least one set of SRS resources for transmitting the SRS; or
in response to failing to receiving the second DCI from the network device within a predetermined period of time since the first DCI is received, disabling the at least one set of SRS resources for transmitting the SRS.

8. A method implemented at a network device, comprising:
in response to at least one set of sounding reference signal (SRS) resources being configured for receiving a SRS from a terminal device and antenna switching being enabled for the terminal device, determining at least one guard period required for receiving the SRS, wherein uplink reception from the terminal device is conditioned to be scheduled outside the at least one guard period;
in response to the uplink reception being scheduled outside the at least one guard period, receiving the SRS from the terminal device over the at least one set of SRS resources; and
in response to the uplink reception being scheduled within the at least one guard period, disabling at least a part of the at least one set of SRS resources for receiving the SRS,
wherein the disabling at least a part of the at least one set of SRS resources for transmitting the SRS comprises:
determining one or more SRS resources in the at least one set of SRS resources to be disable; and
disabling the one or more SRS resources for transmitting the SRS,
wherein the determining one or more SRS resources comprises, in response to the uplink transmission and a second SRS resource in the at least one set of SRS resources being associated with a same configuration about a transmit antenna of the terminal device, excluding the second SRS resource from the one or more SRS resources.

9. The method of claim 8, wherein the determining at least one guard period comprises:
determining the at least one guard period based on a subcarrier spacing of an uplink channel.

10. The method of claim 8, wherein the determining at least one guard period comprises:
determining at least one of the following:
a first guard period prior to the at least one set of SRS resources;
a second guard period subsequent to the at least one set of SRS resources; and
a third guard period between two SRS resources of the at least one set of SRS resources.

11. The method of claim 8, wherein the determining one or more SRS resources comprises:
determining the one or more SRS resources to be disabled based on at least one of the following:
a type of the SRS;
an antenna pattern of the terminal device; and
a subcarrier spacing of an uplink channel.

12. The method of claim 11, wherein the type of the SRS indicates whether the SRS is periodic, semi-persistent or aperiodic.

13. The method of claim 8, wherein the receiving the SRS comprises:
determining a first subcarrier spacing for the uplink reception;
determining a second subcarrier spacing for receiving the SRS based on the first subcarrier spacing, the second subcarrier spacing being a multiple of the first subcarrier spacing; and
receiving the SRS from the terminal device based on the second subcarrier spacing.

14. A device comprising:
a processor; and
a memory coupled to the processor and storing instructions thereon, the instructions, when executed by the processor, causing the device to:
in response to at least one set of sounding reference signal (SRS) resources being configured for transmitting a SRS to a further device and antenna switching being enabled for the device, determine at least one guard period required for transmitting the SRS, wherein transmission to the further device is conditioned to be scheduled outside the at least one guard period;

in response to the transmission being scheduled outside the at least one guard period, transmit the SRS to the further device over the at least one set of SRS resources; and in response to the transmission being scheduled within the at least one guard period, disable at least a part of the at least one set of SRS resources for transmitting the SRS, wherein the instructions, when executed by the processor, causing the device to disable at least a part of the at least one set of SRS resources for transmitting the SRS by:

determining one or more SRS resources in the at least one set of SRS resources to be disable; and disabling the one or more SRS resources for transmitting the SRS, wherein the determining one or more SRS resources comprises, in response to the uplink transmission and a second SRS resource in the at least one set of SRS resources being associated with a same configuration about a transmit antenna of the terminal device, excluding the second SRS resource from the one or more SRS resources.

* * * * *